United States Patent [19]
Young et al.

[11] Patent Number: 5,863,610
[45] Date of Patent: Jan. 26, 1999

[54] PROCESS FOR DEPOSITING A FLUOROCARBONSULFONIC IONOMER ON A SUPPORT AND ARTICLES PREPARED THEREWITH

[75] Inventors: Thomas C. Young, Lake Jackson, Tex.; Carl H. Penner, Oakley, Calif.

[73] Assignee: The Dow Chemical Company, Midland, Mich.

[21] Appl. No.: 771,095

[22] Filed: Dec. 20, 1996

Related U.S. Application Data

[60] Provisional application No. 60/008,929 Dec. 20, 1995.
[51] Int. Cl.⁶ ........................................ B05D 3/04
[52] U.S. Cl. .......................... 427/335; 427/350; 427/384
[58] Field of Search ..................... 427/335, 350, 427/385.5, 384

[56] References Cited

U.S. PATENT DOCUMENTS

| | | |
|---|---|---|
| 3,684,747 | 8/1972 | Coalson et al. . |
| 4,478,695 | 10/1984 | Ezzell et al. ................ 204/98 |
| 4,661,411 | 4/1987 | Martin et al. ............. 428/421 |
| 4,731,263 | 3/1988 | Martin et al. ............ 427/385.5 |
| 5,258,202 | 11/1993 | Pellegrino et al. .......... 427/235 |

FOREIGN PATENT DOCUMENTS

| | | |
|---|---|---|
| 0476866 A1 | 3/1992 | European Pat. Off. . |
| 9524976 | 9/1995 | WIPO . |

OTHER PUBLICATIONS

Anal. Chem. 1986, vol. 58, 2569–2570, Moore III et al.
R. B. Moore, III; C. R. Martin; Chemical and Morphological Properties of Solution—Cast Perfluorosulfonate Ionomers; Macromolecules 1988, vol. 21 pp. 1334–1339.

*Primary Examiner*—Erma Cameron

[57] ABSTRACT

A process for preparing articles having a fluorocarbonsulfonic ionomer layer, such as membranes and catalysts, is disclosed wherein the fluorocarbonsulfonic ionomer is deposited upon support using an new annealing process. The annealing process of the present invention includes the step of heating a fluorocarbonsulfonic ionomer coated substrate in the presence of a vaporous solvent. This process provides for fluorocarbonsulfonic ionomer coated articles which can be annealed quickly at temperatures below the degradation point of many desirable support materials.

18 Claims, No Drawings

PROCESS FOR DEPOSITING A FLUOROCARBONSULFONIC IONOMER ON A SUPPORT AND ARTICLES PREPARED THEREWITH

This application claims the benefit of U.S. provisional application Ser. No. 60/008,929, filed Dec. 20, 1995.

BACKGROUND OF THE INVENTION

This invention relates to a process for depositing fluorocarbonsulfonic ionomers on a support. This invention particularly relates to a process for preparing fluorocarbonsulfonic ionomer membranes and catalysts.

Fluorocarbonsulfonic ionomers are polymers that are substantially fluorinated and have pendant chains containing sulfonic acid or salt groups. Fluorocarbonsulfonic acid polymers are an important class of fluorocarbonsulfonic ionomers. These ionomers are normally produced by copolymerization of a fluorocarbonsulfonyl fluoride polymer precursor, followed by conversion to the ionomer. Methods for the production of monomers, the polymerization and the conversion are well known in the art of preparing polymers.

Fluorocarbonsulfonic ionomers are known to be useful as ion exchange media as well as for preparing gas separation membranes, fuel cell membranes, electrodes, and chloralkali membranes. Fluorocarbonsulfonic acid polymers are very strong acids and are also known to be useful as strong acid catalysts. In catalytic uses, fluorocarbonsulfonic acid polymers are known to catalyze many different reactions: hydration of olefins and epoxides, dehydration of alcohols, alkylation and acylation of paraffins, and the like.

It is known in the art to prepare fluorocarbonsulfonic ionomer articles by several methods. For example, thermoplastic sulfonyl fluoride polymer can be extruded into tubing and converted to the sulfonic ionomer form. But extrusion is not always an advantageous method of preparing such articles. Equipment for extrusion can be both expensive and difficult to handle. In addition, the mechanical properties of fluorocarbonsulfonic ionomer tubing are such that extruding very thin tubes can be impractical.

Another means of preparing fluorocarbonsulfonic ionomer articles is to melt deposit thermoplastic sulfonyl fluoride polymer onto a support and convert the surface to the sulfonic acid form. This process also requires specialized equipment to form the thermoplastic into the desired shape. For catalytic uses, only the surface is used.

A more preferable means of preparing fluorocarbonsulfonic ionomer articles is disclosed by U.S. Pat. No. 4,661,411 to Martin, et al. Therein it is disclosed that fluorocarbonsulfonic ionomer articles can be prepared by depositing a fluorocarbonsulfonic ionomer onto a substrate from a solution by soaking a substrate with a solution that contains a fluorinated polymer having pendant chains containing sulfonic acid groups, removing the solvent from the mixture, and heating the remaining composition to above the glass transition temperature for a time sufficient to render the ionomer insoluble. This process provides advantages including a greater utilization of the polymer. This process is not without problems. It would be desirable in the art to prepare articles with insoluble ionomer layers prepared by means of a process which is substantially faster and utilizes lower temperatures than conventional processes.

SUMMARY OF THE INVENTION

In one aspect, the present invention is a process for depositing a fluorocarbonsulfonic ionomer on a substrate comprising the steps of (A) contacting a substrate with a solution of a fluorinated ionomer having pendant chains including sulfonic acid or salt groups, and at least one solvent, (B) removing most of the solvent from the substrate such that no liquid solvent remains in contact with the substrate and at least a of portion of the fluorinated ionomer is deposited upon the substrate, and (C) heating the substrate and deposited fluorinated ionomer in the presence of vaporous solvent at a temperature of from about 90° C. and to about 300° C. for a time sufficient to render the fluorinated ionomer insoluble.

In another aspect, the present invention is a article of manufacture comprising a substrate and deposited thereon a fluorocarbonsulfonic ionomer wherein the fluorocarbonsulfonic ionomer is deposited using a process having the steps of (A) contacting a substrate with a solution of a fluorinated ionomer having pendant chains including sulfonic acid or salt groups, and at least one solvent, (B) removing most of the solvent from the substrate such that no liquid solvent remains in contact with the substrate and at least a of portion of the fluorinated ionomer is deposited upon the substrate, and (C) heating the substrate and deposited fluorinated ionomer in the presence of vaporous solvent at a temperature of from about 90° C. to about 300° C. for a time sufficient to render the fluorinated ionomer insoluble.

In still another aspect, the present invention is, in a process for depositing a fluorocarbonsulfonic ionomer on a substrate including the steps of: (A) contacting a substrate with a solution of a fluorinated ionomer having pendant chains including sulfonic acid or salt groups, and at least one solvent, (B) removing the solvent from the substrate such that no liquid solvent remains in contact with the substrate and at least a portion of the fluorinated ionomer is deposited upon the substrate, and (C) heating the substrate and deposited fluorinated ionomer at a temperature above the glass transition point for the ionomer for a time sufficient to render the fluorinated ionomer insoluble (annealing), the improvement comprising adding or leaving solvent in the system such that the annealing takes place in the presence of vaporous solvent.

DESCRIPTION OF THE PREFERRED EMBODIMENTS

In one embodiment, the present invention is a process for depositing a fluorocarbonsulfonic ionomer on a substrate. Ionomers useful with the present invention have structures that include a substantially fluorinated carbon chain that has attached to it side chains that are also substantially fluorinated and contain sulfonic acid groups, sulfonate salt groups or derivatives of sulfonic acid groups. There may be other side chains present that do not contain sulfonic acid groups or sulfonic acid derivatives, such as fully or partially fluorinated alkyl or ether chains. Other atoms may also be present in these side chains, such as oxygen, chlorine and bromine. Examples of these polymers include those described in U.S. Pat. Nos. 3,041,317; 3,282,875; 3,909,378; 4,025,405; 4,192,725; 4,329,435; 4,330,654; 4,358,545; 4,337,137; 4,417,969; 4,462,877; 4,470,889; and 4,478,695. In addition, ionomers useful with the present invention have been available under the trade designation NAFION, a trade designation of E. I. DuPont de Nemours & Co.

Fluorocarbonsulfonic ionomers useful with the present invention have the general formula:

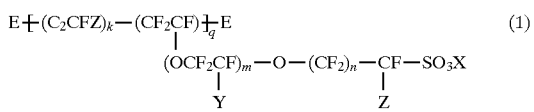

$$E + (C_2CFZ)_k - (CF_2CF)_q - E \quad (1)$$
$$(OCF_2CF)_m - O - (CF_2)_n - CF - SO_3X$$
$$\quad\quad\quad\quad | \quad\quad\quad\quad\quad\quad |$$
$$\quad\quad\quad\quad Y \quad\quad\quad\quad\quad\quad Z$$

wherein C designates carbon, S designates sulfur, N designates nitrogen, and O designates oxygen and wherein Y is: fluorine (F), chlorine (Cl), bromine (Br), $CF_3$, $CF_2Cl$ or a $C_{2-10}$ fluoroalkyl group; Z is independently in each occurrence: F, Cl, or a $C_{1-10}$ fluoroalkyl group; X is a cation, preferably: hydrogen (H), sodium (Na), lithium (Li), potassium (K), or $NR_4$; R is independently in each occurrence: H, $CH_3$, $C_2H_5$, or a $C_{3-10}$ alkyl group; k is an integer from 1–15; m is an integer from 0 to 4, n is an integer from 1 to 4 and q is an integer greater than 20, preferably greater than 50, and E is a terminating end group wherein such end groups are derivatives of initiators, terminators or comonomers used in the polymerization of the ionomer. Preferred fluorocarbonsulfonic ionomers for use with the present invention can have the general formulas:

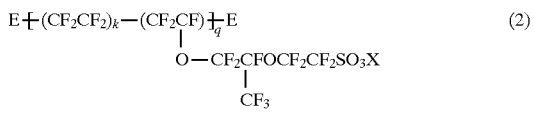

$$E + (CF_2CF_2)_k - (CF_2CF)_q - E \quad (2)$$
$$O - CF_2CFOCF_2CF_2SO_3X$$
$$| $$
$$CF_3$$

and

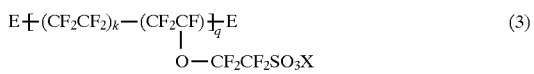

$$E + (CF_2CF_2)_k - (CF_2CF)_q - E \quad (3)$$
$$O - CF_2CF_2SO_3X$$

In embodiments of conventional technology for preparing substrates coated with fluorocarbonsulfonic ionomers, the ionomer is dissolved in either a solvent or solvent admixture, applied to a substrate, dried, and then annealed. Methods for preparing solutions of fluorocarbonsulfonic ionomers are well known in the art. U.S. Pat. No. 4,661,411 discloses a method of preparing solutions of a perfluorinated sulfonic acid polymer with chemical formula number 3 above in ethanol and water. Other methods generally require the ionomer and solvents to be heated, with agitation, to high temperatures in a high pressure autoclave for a few hours. The mixtures prepared by these methods may not be true solutions, but instead may be suspensions or dispersions of finely divided or partially agglomerated particles. For the purposes of the present invention, the term 'solution' is used to also encompass imperfect polymer solutions such as dispersions and suspensions.

Aqueous alcohols are often used to prepare solutions of fluorocarbonsulfonic ionomers, but many other solvents may be used. For example, solvents useful with the present invention include, but are not limited to, water, triethylphosphate, triphenyl phosphate, dimethyl sulfoxide, sulfolane, dimethyl formamide, n-methyl pyrrolidinone and other aprotic solvents, 1-methoxy-2-propanol, 2-methoxyethanol, 2-ethoxyethanol, glycerol, ethylene glycol and other glycols, ethylene glycol dimethyl ether, ethylene glycol diethyl ether, diethylene glycol dimethyl ether, diethylene glycol diethyl ether and other glycol ethers, dioxane, dimethyl acetamide, tetramethyl urea, butyrolactone acetonitrile, methanol, ethanol, n-propanol, isopropanol, n-butanol, 2-butanol, pentanol, cyclohexanol, or other higher alcohols. Some solvents are known to degrade or react with the ionomers under the high-pressure, high-temperature conditions of the dissolution process, especially when fluorocarbonsulfonic ionomers are dissolved. Consequently, solutions may also be formed by dissolving the ionomers of the present invention in one solvent or mixture of solvents, then adding another solvent after the initial solution has cooled. Evaporation techniques may also be used to replace one or more solvents with other solvents, after the initial solution has been formed.

Essentially any material that may usefully serve as a carrier can be used as a support for a deposited layer of fluorocarbonsulfonic ionomer. The material used for a support may vary from application to application. For example, the preferred properties for a catalyst support may be significantly different than the preferred properties for a membrane support. Properties that may be important in some situations include porosity, pore size, surface area, crush strength, chemical resistance, thermal stability, tensile strength, flexibility, modulus, size, uniformity, texture and cost. The support material must be resistant to the fluorocarbonsulfonic ionomer solution, and to the temperatures of the deposition and heat treatment process. Some representative materials that could serve as catalyst supports include alumina, zeolites, silica, silica-alumina, ceramics, porous glass, silicon carbide, spinel, clay and carbon. Some representative materials that could serve as membrane supports include porous polymeric materials such as teflon, nylon, polypropylene, polyvinylidene fluoride, polysulfone, acrylics, polyimides, and porous nonpolymeric materials such as ceramic, glass, wire mesh, cloth fabric, alumina and others. Other materials not listed here might also be useful support materials for certain applications.

The process of the present invention can include a drying step. Drying is the removal of substantially all solvent material from the ionomer deposited on a support. Small amounts of the solvents may remain trapped in the deposited ionomer after drying, but the intention of the drying process is to remove substantially all of the solvent.

Annealing is also a necessary step in the process of the present invention. Annealing, also known as heat treating, is required for most applications since the ionomer, without annealing, can be soluble. For example, in a catalyst application, the ionomer can release from the substrate and be lost in solution with the reactants if the ionomer is too soluble. Likewise, when the ionomer is used as a membrane for separating carbon dioxide and natural gas, the liquid contained in natural gas can cause membranes prepared with fluorocarbonsulfonic ionomers to fail very quickly if the ionomers are soluble in those liquids.

Conventional annealing is the exposure of the deposited ionomer to elevated temperatures, in order to reduce the solubility of the ionomer. Annealing is normally done in the presence of air, in the presence of an inert gas, or under vacuum. Annealing may take place at any temperature above the glass transition temperature of the ionomer, but the time required is strongly dependent on the annealing temperature. The glass transition temperature of many ionomers of interest with the present invention is from 20° C. to 50° C. However, the time required for annealing at temperatures below 150° C. can be considered prohibitively long, and temperatures between 150° C. and 300° C. are considered preferable. Unfortunately, many support materials of interest are not thermally stable at these temperatures. This is especially true for many of the polymeric materials that would be useful as membrane supports. This problem can be substantially avoided with the process of the present invention.

In the process of the present invention, the annealing time at a given temperature is substantially reduced by annealing in the presence of one or more vaporous solvents. This process is called solvent-enhanced annealing. While conventional annealing is done in the substantial absence of any solvents, in solvent-enhanced annealing, one intentionally maintains the ionomer in a solvent-containing atmosphere.

Many solvents can be used to speed the heat treatment process. Preferred solvents are those that swell and plasticize the ionomer structure, allowing the annealing process to proceed more rapidly. Suitable vaporous solvents may include: triethylphosphate, triphenyl phosphate, dimethyl sulfoxide, sulfolane, dimethyl formamide, n-methyl pyrrolidinone, 1-methoxy-2-propanol, 2-methoxyethanol, 2-ethoxyethanol, glycerol, ethylene glycol, ethylene glycol dimethyl ether, ethylene glycol diethyl ether, diethylene glycol dimethyl ether, diethylene glycol diethyl ether, dioxane, dimethyl acetamide, tetramethyl urea, butyrolactone, acetonitrile, methanol, ethanol, n-propanol, isopropanol, n-butanol, 2-butanol, pentanol, and cyclohexanol Other gases may be present during the annealing process, including air, nitrogen and other non-flammable or inert gases. Non-flammable or inert gases are preferred in order to prevent the formation of a flammable or explosive gas mixture. Alternatively, no other gases may be present, and an annealing system might be evacuated before a solvent is introduced.

Solvent-enhanced annealing can be done in any system where solvent can be intentionally introduced or maintained during heat treatment. Solvent is preferably maintained in the vapor state, but some liquid may be present. However, the amount of liquid should be kept small enough so that the deposited ionomer will not wash or run off. The level of solvent can be characterized by the partial pressure of solvent in the vapor of the system. The degree of enhancement will depend on the partial pressure and the equilibrium amount of solvent absorbed by the ionomer at that partial pressure and temperature. The preferred partial pressure of solvent in the vapor during annealing is from 1 mm Hg (0.13 kPa) up to the saturation pressure of the solvent. More preferred partial pressures of solvent are from 1 psi (6.9 kPa) up to the saturation pressure.

Solvent-enhanced annealing can be done at any temperature where the time required is acceptably short and that does not result in the degradation of any of the materials. Acceptably short times are generally not achieved below 90° C. Practical upper limits on the temperature may be set by the thermal stability of the ionomer, the support material or the solvent. A practical upper limit for most ionomers is approximately 300° C. The upper limit for the solvent depends on the solvent used. However, some solvents may undergo reactions with the ionomer, especially a fluorocarbonsulfonic acid polymer, and this may set practical upper limits on the annealing temperature. Preferably, the annealing temperature is between 125° C. and 200° C. Most preferably, the annealing temperature is between 140° C. and 175° C.

The fluorocarbonsulfonic ionomer coated substrates of the present invention can be prepared using either a one step or a two step process. In a one step process, a substrate is coated with a fluorocarbonsulfonic ionomer and solvent solution, the solvent is then dried using a closed system wherein substantially no liquid solvent is left in contact with the fluorocarbonsulfonic ionomer coated substrate, and the fluorocarbonsulfonic ionomer coated substrate is then annealed in the presence of vaporous solvent which was driven off from the fluorocarbonsulfonic ionomer coated substrate. A two step process is similar to the one step except that the fluorocarbonsulfonic ionomer coated substrate is dried using an open system wherein all of the solvent is driven off. Then, in a second step, either new or recovered solvent is used for annealing the fluorocarbon-sulfonic acid ionomer coated substrate. In either process, the annealing step is done in the presence of vaporous solvent.

The following examples are provided to illustrate the present invention. The examples are not intended to limit the scope of the present invention and they should not be so interpreted. Amounts are in weight parts or weight percentages unless otherwise indicated.

EXAMPLE 1

Samples of nylon support (ZETAPOR, a trade designation of CUNO, INC.) are coated with a solution of 7.5% by weight perfluorosulfonic acid polymer, the ionomer being prepared by emulsion copolymerization of tetrafluoroethylene and 5-fluorosulfonyl-3-oxa heptafluoro-1-pentene with an ammonium persulfate initiator, followed by hydrolysis and conversion to the sulfonic acid form, the ionomer having an acid equivalent weight of about 800 g/eq, and the ionomer solution being prepared by dissolving the ionomer in 75% (by volume) DMF and 25% (by volume) H2O. The coating is applied and dried using a Model TT Coater made by the Faustel Corporation. The coater is equipped with a forced convection drying tunnel. The coating is applied at ambient temperature and then dried at 130° C. The coating thickness is determined by weight difference to be 5–10 microns. One weighed sample of the coated material is placed in an (50:50 by volume) ethanol/water solution and agitated using an ultrasonic bath for 1 hour. The samples of the coated material are then dried and weighed. By weight difference, 75% of the coated material is found to have dissolved in the ethanol/water solution.

Samples of the coated material are then placed in a closed 3 gallon vessel and 15 ml of DMF is placed in the bottom of the vessel. The vessel is then filled with nitrogen at atmospheric pressure, and sealed. The closed vessel is then placed in an oven and heated to a temperature of 150° C. and annealed for a period of 4–17 hours, during which time the pressure inside the vessel increased to approximately 15 psig (205 kPa). The partial pressure of solvent is calculated to be approximately 8.7 psi (60 kPa). The vessel is then cooled, and the samples are dried and weighed. The samples are then agitated in the ethanol/water solution in an ultrasonic bath, dried and weighed. The amount of coated material lost from the support is determined and reported below in Table 1. No discoloration or deterioration of the samples is observed.

TABLE 1

| Loss of Ionomer After Annealing | |
|---|---|
| ANNEALING TIME | PERCENT IONOMER LOSS |
| 0 HOURS | 75 |
| 4 HOURS | 24 |
| 17 HOURS | 12 |

COMPARATIVE EXAMPLE 2

In this example, methods known in the art are demonstrated. This is not an example of the present invention. A nylon support (ZETAPOR, a trade designation of CUNO, INC.) of known weight is coated with a solution of 5% by weight of the same ionomer as used in Example 1.

The coating is applied by hand at ambient temperature using a 10 mil (0.0254 cm) doctor blade. The sample is dried in a forced-convection oven at 107° C. for 10–15 minutes until dried. One weighed sample of the coated material is placed in a solution of 50% (by volume) denatured ethanol and 50% (by volume) deionized water and agitated in an ultrasonic bath for 1 hour. The sample is then dried and weighed. By weight difference, 77% of the coated material is found to have dissolved in the ethanol/water solution.

Samples of the coated material are then annealed by placing them in a convection oven at a temperature of 160° C. for a period of 1–4 days. These samples are also placed in an ethanol/water solution and agitated according to the above procedure. The amount of coated material lost from the support is determined and reported below in Table 2. The samples were found to have progressively discolored, indicating some degradation.

TABLE 2

Loss of Ionomer After Annealing Using Prior Art

| ANNEALING TIME | PERCENT IONOMER LOSS |
|---|---|
| 0 DAYS | 77 |
| 1 DAY | 70 |
| 2 DAYS | 59 |
| 3 DAYS | 80 |
| 4 DAYS | 88 |

What is claimed is:

1. A process for depositing a fluorocarbonsulfonic ionomer on a substrate comprising the steps of:
   (A) contacting a substrate with a solution of a fluorinated ionomer having pendant chains including sulfonic acid or sulfonic salt groups, and at least one solvent;
   (B) removing most of the solvent of step (A) from the substrate such that no solvent in a liquid form remains in contact with the substrate and at least a portion of the fluorinated ionomer is deposited upon the substrate;
   (C) thereafter contacting the substrate coated with the fluorinated ionomer with a vaporous solvent; and
   (D) heating the substrate and fluorinated ionomer in the presence of the vaporous solvent at a temperature of from about 90° C. to about 300° C. for a time sufficient to render the fluorinated ionomer insoluble.

2. The process of claim 1 wherein the solvent of step (A) and the vaporous solvent of step (C) are the same solvent.

3. The process of claim 1 wherein the solution of step (A) includes one or more solvents selected from the group consisting of water, aprotic solvents, glycols, glycol ethers and alcohols.

4. The process of claim 1 wherein the solution of step (A) includes one or more solvents selected from the group consisting of water, triethylphosphate, triphenyl phosphate, dimethyl sulfoxide, sulfolane, dimethyl formamide, n-methyl pyrrolidinone, 1-methoxy-2-propanol, 2-methoxyethanol, 2-ethoxyethanol, glycerol, ethylene glycol, ethylene glycol dimethyl ether, ethylene glycol diethyl ether, diethylene glycol dimethyl ether, diethylene glycol diethyl ether, dioxane, dimethyl acetamide, tetramethyl urea, butyro lactone, acetonitrile, methanol, ethanol, n-propanol, isopropanol, n-butanol, 2-butanol, pentanol, and cyclohexanol.

5. The process of claim 1 wherein the substrate is made from a material selected from the group consisting of teflon, nylon, polypropylene, polyvinylidene fluoride, polysulfone, acrylics, polyimides, ceramic, glass, cloth fabric, wire mesh, ion exchange membranes, porous diaphragms and alumina.

6. The process of claim 1 wherein the partial pressure of the vaporous solvent during the heating of step (C) is from 1 mmHg (0.13 kPa) up to the saturation pressure of the solvent.

7. The process of claim 6 wherein the partial pressure is at least 1 psi (6.9 kPa).

8. The process of claim 1 wherein the vaporous solvent is selected from the group consisting of triethylphosphate, triphenyl phosphate, dimethyl sulfoxide, sulfolane, dimethyl formamide, n-methyl pyrrolidinone, 1-methoxy-2-propanol, 2-methoxyethanol, 2-ethoxyethanol, glycerol, ethylene glycol, ethylene glycol dimethyl ether, ethylene glycol diethyl ether, diethylene glycol dimethyl ether, diethylene glycol diethyl ether, dioxane, dimethyl acetamide, tetramethyl urea, butyro lactone, acetonitrile, methanol, ethanol, n-propanol, isopropanol, n-butanol, 2-butanol, pentanol, and cyclohexanol.

9. The process of claim 8 wherein the vaporous solvent is dimethylformamide (DMF).

10. The process of claim 1 wherein the heating temperature is between 125° C. to 200° C.

11. The process of claim 1 wherein the heating temperature is from 140° C. to 175° C.

12. The process of claim 1 wherein the fluorinated ionomer corresponds to the formula:

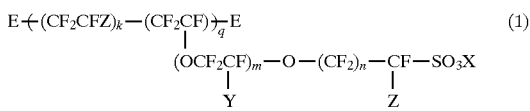

wherein C designates carbon, S designates sulfur, N designates nitrogen, and O designates oxygen and wherein Y is: fluorine (F), chlorine (Cl), bromine (Br), $CF_3$, $CF_2Cl$ or a $C_{2-10}$ fluoroalkyl group; Z is independently in each occurrence: F, Cl, or a $C_{1-10}$ fluoroalkyl group; X is a cation; k is an integer from 1–15; m is an integer from 0 to 4, n is an integer from 1 to 4 and q is an integer greater than 20, and E is a terminating end group wherein such end groups are derivatives of initiators, terminators or comonomers used in the polymerization of the ionomer.

13. The process of claim 12 wherein X is hydrogen, sodium, lithium, potassium or a cation corresponding to the formula $NR_4$ where R is independently in each occurrence: H, $CH_3$, $C_2H_5$, or a $C_{3-10}$ alkyl group.

14. The process of claim 13 wherein the fluorinated monomer has the general formula:

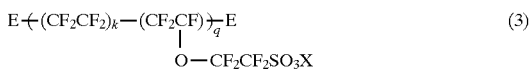

15. The process of claim 13 wherein the fluorinated ionomer has the general formula:

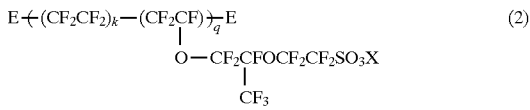

16. In a process for depositing a fluorocarbonsulfonic ionomer on a substrate including the steps of:
   (A) contacting a substrate with a solution of a fluorinated ionomer having pendant chains including sulfonic acid or sulfonic salt groups, and at least one solvent,
   (B) removing solvent from the substrate such that no solvent in a liquid form remains in contact with the substrate and at least a portion of the fluorinated ionomer is deposited upon the substrate, and
   (C) heating the substrate and deposited fluorinated ionomer at a temperature above the glass transition point for the ionomer for a time sufficient to render the fluorinated ionomer insoluble, the improvement comprising adding a vaporous solvent such that the heating of step (C) takes place in the presence of vaporous solvent.

17. A process for depositing a fluorocarbonsulfonic ionomer on a substrate comprising the steps of:
  (A) contacting a substrate with a solution of a fluorinated ionomer having pendant chains including sulfonic acid or sulfonic salt groups, and at least one solvent;
  (B) removing most of the solvent of step (A) from the substrate such that no solvent in a liquid form remains in contact with the substrate and at least a portion of the fluorinated ionomer is deposited upon the substrate; and
  (C) heating the substrate and fluorinated ionomer in a sealed vessel having a vaporous solvent therein in the presence of the vaporous solvent at a temperature of from about 90° C. to about 300° C. for a time sufficient to render the fluorinated ionomer insoluble.

18. A process for treating a substrate having a fluorocarbonsulfonic ionomer deposited thereon comprising the steps of:
  (A) contacting the substrate with a vaporous solvent; and
  (B) heating the substrate and fluorinated ionomer in the presence of the vaporous solvent at a temperature of from about 90° C. to about 300° C. for a time sufficient to render the fluorinated ionomer insoluble.

* * * * *